May 25, 1926.  1,585,858
E. B. HIATT
BASKET LIDDING TOOL
Filed June 23, 1925   2 Sheets-Sheet 1
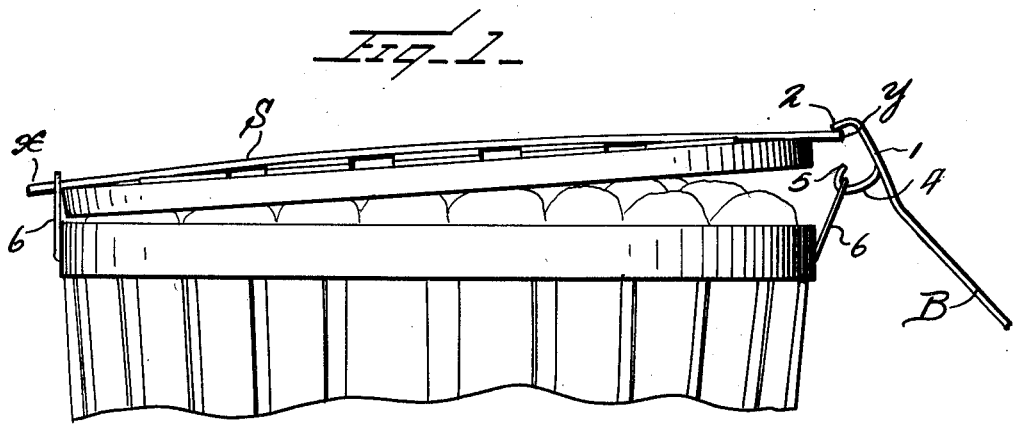
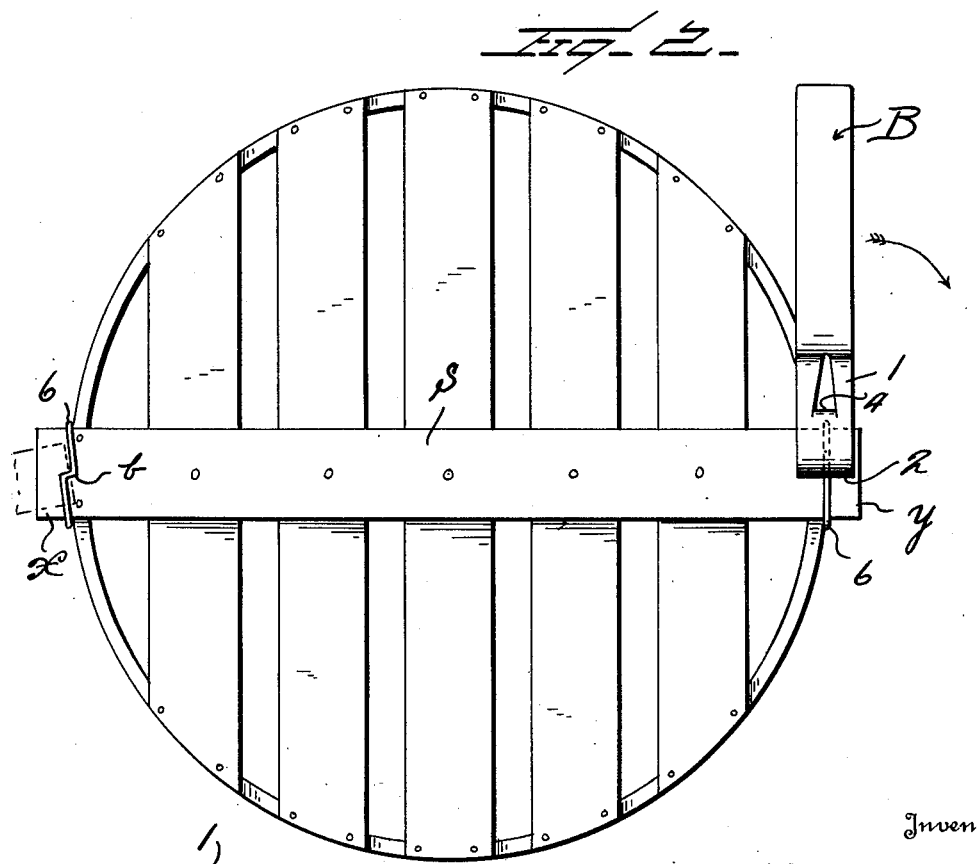
Inventor
E. B. Hiatt
By Watson E. Coleman
Attorney

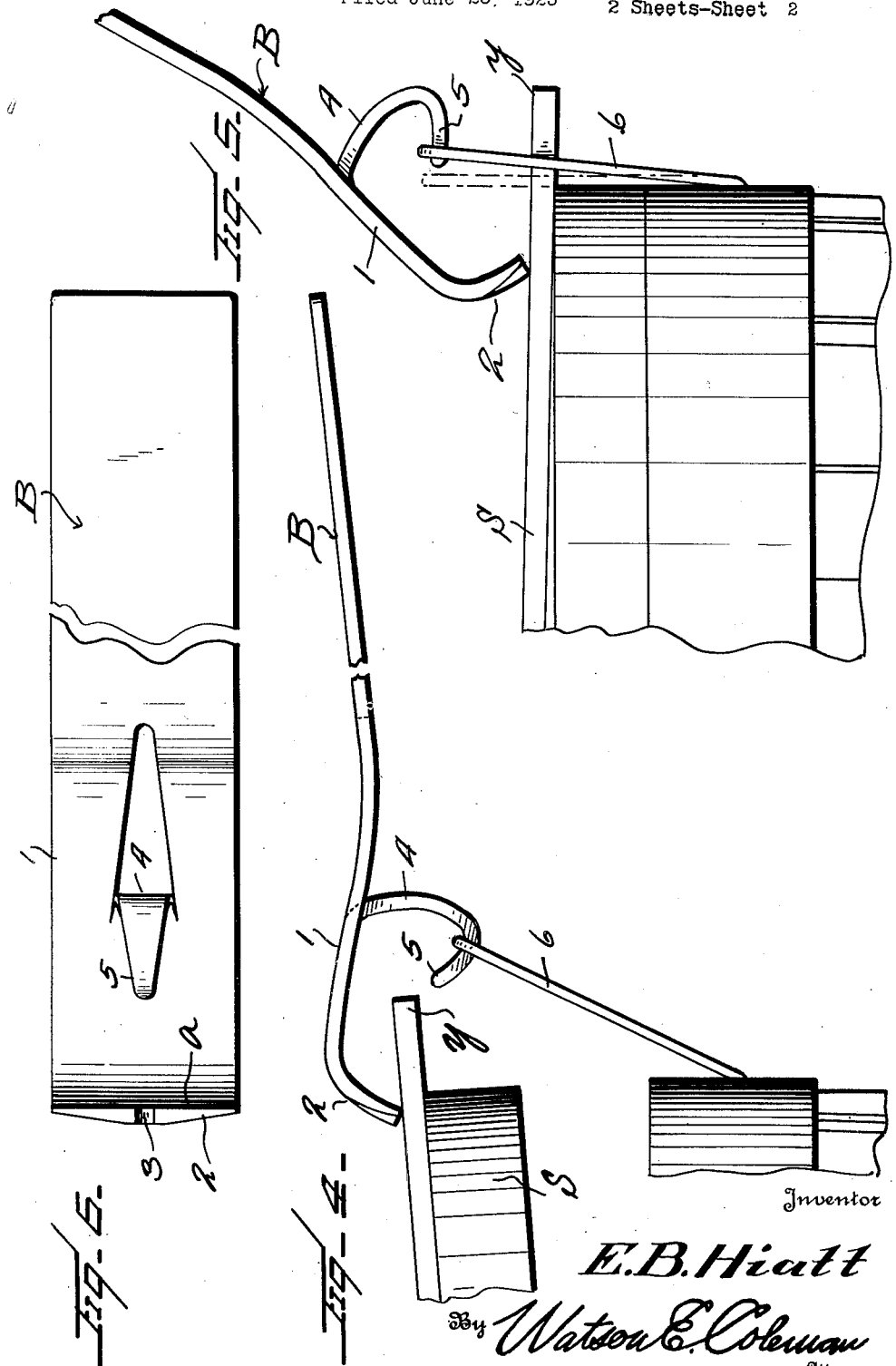

Patented May 25, 1926.

1,585,858

UNITED STATES PATENT OFFICE.

ENOS B. HIATT, OF PALISADE, COLORADO.

BASKET-LIDDING TOOL.

Application filed June 23, 1925. Serial No. 39,114.

This invention relates to a basket lidding tool and it is an object of the invention to provide a tool of this kind especially designed and adapted for use in the applying of a lid to a fruit basket or the like.

It is also an object of the invention to provide a novel and improved tool which is adapted to be swung about a basket handle as a fulcrum and which is engageable with the lid in a manner to assure the proper placing of the lid upon rocking movement of the tool in one direction.

The invention consists in the details of construction and in the combination and arrangement of the several parts of my improved basket lidding tool whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in elevation of a fruit basket with a lid partially applied and showing a tool constructed in accordance with an embodiment of my invention in initial position;

Figure 2 is a view in top plan of an applied lid showing the use of the tool to twist a basket handle to assure effective maintenance of the lid in applied position;

Figure 3 is a fragmentary view in perspective of the working end of the tool as herein disclosed;

Figure 4 is an enlarged fragmentary view in side elevation illustrating my improved tool in a second position during the application of a lid;

Figure 5 is a view similar to Figure 4 but illustrating the position of the tool at substantially its time of release;

Figure 6 is a view in bottom plan of my improved tool as herein disclosed.

My improved tool as herein disclosed comprises an elongated flat bar or member B, preferably of metal, and has an end portion 1 disposed on a slight outward incline and terminating in a relatively abrupt lip 2 disposed in the direction opposite to the outward incline of the portion 1. This lip 2 at substantially its center is provided with a notch or recess 3 and the free end of said lip 2 is gradually increased in thickness toward said notch or recess 3, as particularly illustrated in Figure 6, in order to assure said central portion of the lip possessing a maximum of strength. It is to be especially noted, however, that the inner edge $a$ of said free end of the lip 2 is substantially straight and at right angles to the longitudinal axis of the bar or member B.

Struck from the portion 1 at a desired point inwardly of the lip 2 is a finger 4 disposed in the same general direction as the lip 2 and terminating in a returned bill 5 disposed in a direction toward the junction or joining point between the lip 2 and the portion 1.

As now done, the applying of the lids of fruit baskets results in blistering and otherwise injuring the hands and at the same time is a laborious service. With my improved tool, a lid may be readily and quickly applied with a minimum of effort due to the leverage action afforded thereby and without in any way blistering the hands. In practice, the extended end portion $x$ of a conventional lid slat S is inserted through one of the basket handles 6 with the result that the lid L is disposed on an upward incline toward the second handle occasioned by the contents of the basket, as is particularly illustrated in Figure 1. After this operation the bill 5 of the finger 4 is engaged from below with the second handle 6, as illustrated in Figure 1, with the straight edge $a$ of the lip 2 in contact from above with the second or opposite extended portion $y$ of the slat S. Upward pull is imposed upon the outer end of the bar or member B resulting in said raised portion of the lid to be forced downwardly as illustrated in Figures 4 and 5 with a resultant outward movement of the handle 6 until said raised end portion is forced downwardly sufficiently to permit the extended portion $y$ of the slat S to extend through the second handle member 6, as illustrated in Figure 5, and at which time the bar 5 will be in a position to free itself from the handle 6.

In view of the foregoing, it will be noted that the handle 6 with which the bill 5 is engaged serves as a fulcrum for the member or bar B to permit the requisite swinging movement thereof to assure sufficient leverage action to force the raised portion of the lid downwardly sufficient to effect the complete application of the lid. After the lid has been applied, each of the handles 6 is adapted to have its intermediate portion twisted or crimped, as indicated at *b* in Figure 2, by engaging the intermediate portion of each of the handles within the notch or recess 3, as also indicated in Figure 2, and giving requisite turning movement to the tool. By this means, the tool is also permitted to be used to assure an effective locking of the lid in applied position.

From the foregoing description it is thought to be obvious that a basket lidding tool constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A basket lidding tool comprising an elongated member provided with a lip at one end portion extending beyond a face thereof, a finger extending outwardly from the member inwardly of the lip and disposed in the same general direction as the lip, said finger terminating in a bill disposed toward the lip.

2. A basket lidding tool comprising an elongated member provided with a lip at one end portion extending beyond a face thereof, a finger extending outwardly from the member inwardly of the lip and disposed in the same general direction as the lip, said finger terminating in a bill disposed toward the juncture of the lip and member.

3. A basket lidding tool comprising an elongated member provided with a lip at one end portion extending beyond a face thereof, a finger extending outwardly from the member inwardly of the lip and disposed in the same general direction as the lip, said finger terminating in a bill disposed toward the lip, the end portion of the member provided with the lip being inclined with respect to the remaining portion of the member.

4. A basket lidding tool comprising an elongated member provided with a lip at one end portion extending beyond a face thereof, a finger extending outwardly from the member inwardly of the lip and disposed in the same general direction as the lip, said finger terminating in a bill disposed toward the lip, the free end of the lip being provided with a notch.

5. A basket lidding tool comprising an elongated member provided with a lip at one end portion extending beyond a face thereof, a finger extending outwardly from the member inwardly of the lip and disposed in the same general direction as the lip, said finger terminating in a bill disposed toward the lip, the inner edge of the free end of the lip being substantially straight and at right angles to the longitudinal axis of the member.

In testimony whereof I hereunto affix my signature.

ENOS B. HIATT.